US012759338B2

(12) United States Patent
Nungesser et al.

(10) Patent No.: US 12,759,338 B2
(45) Date of Patent: Oct. 13, 2026

(54) IN-LINE PROCESS FOR PREPARING PAINT

(71) Applicant: Rohm and Haas Company, Collegeville, PA (US)

(72) Inventors: Edwin A. Nungesser, Horsham, PA (US); Mario G. L. Mirabelli, Horsham, PA (US); Philip R. Harsh, Birdsboro, PA (US); James C. Bohling, Lansdale, PA (US)

(73) Assignee: Rohm and Haas Company, Collegeville, PA (US)

(*) Notice: Subject to any disclaimer, the term of this patent is extended or adjusted under 35 U.S.C. 154(b) by 407 days.

(21) Appl. No.: 18/556,495

(22) PCT Filed: May 17, 2022

(86) PCT No.: PCT/US2022/029610
§ 371 (c)(1),
(2) Date: Oct. 20, 2023

(87) PCT Pub. No.: WO2022/241327
PCT Pub. Date: Nov. 17, 2022

(65) Prior Publication Data

US 2024/0198717 A1 Jun. 20, 2024

Related U.S. Application Data

(60) Provisional application No. 63/188,616, filed on May 14, 2021.

(51) Int. Cl.
*C09D 7/00* (2018.01)
*B44D 3/06* (2006.01)
*C09D 5/02* (2006.01)
*C09D 7/80* (2018.01)

(52) U.S. Cl.
CPC ............... *B44D 3/06* (2013.01); *C09D 5/028* (2013.01); *C09D 7/80* (2018.01)

(58) Field of Classification Search
CPC ............... B44D 3/06; B44D 3/08; C09D 7/80
See application file for complete search history.

(56) References Cited

U.S. PATENT DOCUMENTS

| | | | |
|---|---|---|---|
| 8,710,133 B2 | 4/2014 | Bohling et al. | |
| 9,410,053 B2 | 8/2016 | Kamel et al. | |
| 9,920,194 B2 | 3/2018 | Bohling et al. | |
| 9,932,431 B2 | 4/2018 | Brownell et al. | |
| 2002/0013401 A1 | 1/2002 | Friel et al. | |
| 2003/0110101 A1 | 6/2003 | Friel et al. | |
| 2004/0190367 A1 | 9/2004 | Wierzbicki et al. | |
| 2009/0099695 A1 | 4/2009 | Trevino, III et al. | |
| 2018/0085718 A1 | 3/2018 | Van Der Meer et al. | |
| 2022/0010148 A1* | 1/2022 | Donlon | C09D 7/80 |

FOREIGN PATENT DOCUMENTS

| | | | |
|---|---|---|---|
| EP | 1125643 | 8/2001 | |
| EP | 3498785 | 6/2021 | |
| GB | 2292695 | 3/1996 | |
| GB | 2292695 A * | 3/1996 | B01F 23/49 |

* cited by examiner

*Primary Examiner* — Anshu Bhatia

(57) ABSTRACT

The present invention is a process for preparing one or more paints by flowing and merging pre-paints from pre-paint storage tanks into a mixing chamber and into a paint container.

5 Claims, 1 Drawing Sheet

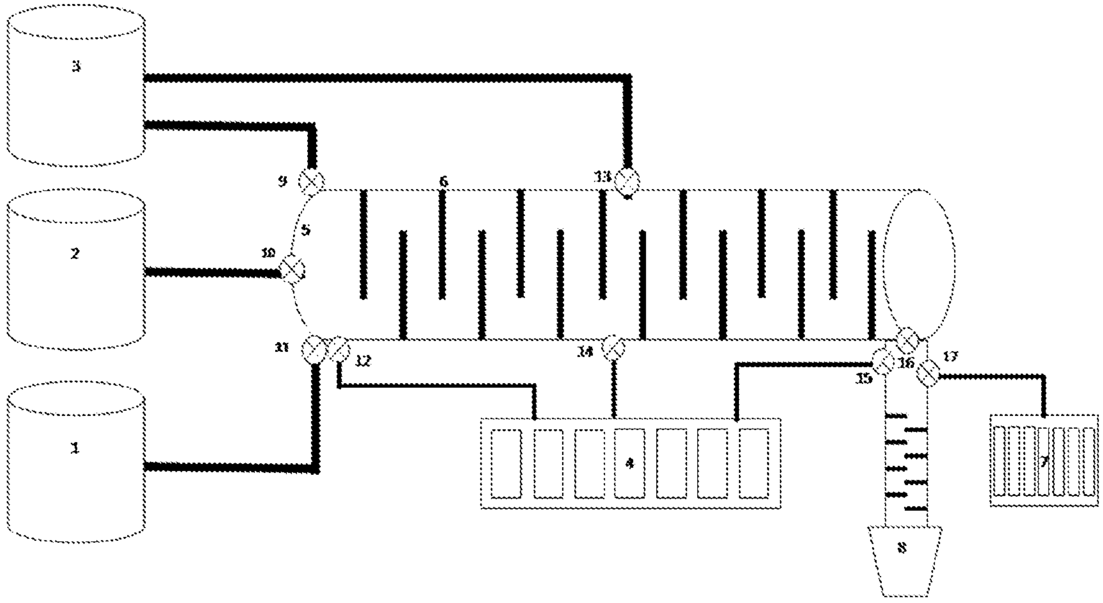
3
2
1
9
6
13
5
10
11
12
14
15
16
17
4
7
8

IN-LINE PROCESS FOR PREPARING PAINT

BACKGROUND OF THE INVENTION

The present invention relates to an in-line process for manufacturing paints, more particularly, an in-line mixing process adapted to manufacture a variety of paints continuously or semi-continuously.

Paints sold in retail outlets are typically produced in bulk by a batch process that includes grinding pigment and extender particles to form a solid dispersion, then combining this dispersion in a so-called letdown stage with binder, thickeners, and other additives. The batch process produces paint bases of different concentrations of pigment and extender that are transported to the retail outlet where colorant is added to the paint to meet the demands of the consumer. This base system model of paint production requires substantial inventory and is further disadvantaged by using a fixed amount of $TiO_2$ where the flexibility to adjust $TiO_2$ levels would be desirable. For example, where a colorant requires lower amounts $TiO_2$ than present in the untinted paint to achieve the desired tint, excess colorant would need to be added to balance the excess $TiO_2$. The unnecessary costs associated with the use of excess $TiO_2$ and colorant as well as the additional time required to prepare the final paint are examples of inefficiencies in the base system model that need to be addressed.

An alternative to the base system model is a point-of-sale model where cans of paint are made by concurrent dispensing of binder, pigment, and extender components from separate holding tanks into a paint container, then mixing the contents of the container. (See US 2003/0110101, para [0027] and [0028].) Although this point-of-sale model is an improvement on the base system model, it is still a labor and cost intensive batch process that relies on both the speed of dispensing the materials into a container and the time it takes to mix the materials in the container and to stabilize the viscosity of the final paint.

Accordingly, it would be advantageous to make cans of paint by a more efficient and versatile process.

SUMMARY OF THE INVENTION

The present invention addresses a need in the art by providing a process for preparing a container of paint comprising the steps of:

a) feeding into a mixing chamber 1) an aqueous dispersion of polymer particles from a first pre-paint storage vessel and 2) either or both of i) an aqueous dispersion of opacifying pigment particles from a second pre-paint storage vessel and ii) an aqueous dispersion of a matting agent from a third pre-paint storage vessel;

b) mixing the aqueous dispersions in the mixing chamber to form a fully blended paint; and c) dispensing the fully blended paint into a paint container;

wherein the polymer particles have a z-average particle size in the range of from 50 nm to 600 nm.

BRIEF DESCRIPTION OF DRAWINGS

FIG. 1 is a schematic of an apparatus used to make a paint by the process of the present invention.

DETAILED DESCRIPTION OF THE INVENTION

The present invention is a process for preparing a container of paint comprising the steps of:

a) feeding into a mixing chamber 1) an aqueous dispersion of polymer particles from a first pre-paint storage vessel and 2) either or both of i) an aqueous dispersion of opacifying pigment particles from a second pre-paint storage vessel and ii) an aqueous dispersion of a matting agent from a third pre-paint storage vessel;

b) mixing the aqueous dispersions in the mixing chamber to form a fully blended paint; and c) dispensing the fully blended paint into a paint container;

wherein the polymer particles have a z-average particle size in the range of from 50 nm to 600 nm.

The process of the present invention provides an efficient and rapid way of making a wide variety of paints.

FIG. 1 illustrates an example of a preferred apparatus for carrying out the process of the present invention. In a first embodiment of the process of the present invention, an aqueous slurry of an opacifying pigment stored in pre-paint storage tank (1) and an aqueous dispersion of polymer particles (a latex) stored in pre-paint storage tank (2) are fed through valves (10) and (11) respectively into mixing chamber (5) fitted with mixing baffles (6) and mixed to form an aqueous dispersion of the opacifying pigment and the latex. Mixing chamber (5) is preferably an in-line continuous flow mixer, more preferably an in-line static mixer. The pre-paints in storage tanks (1) and (2) are each blended with a rheology modifier, and it is desirable for the blended pre-paints to comprise a KU builder to promote mid-shear viscosity and an ICI builder to promote high-shear viscosity in the final paint. In one embodiment, pre-paint storage tank (1) contains an ICI builder, and pre-paint storage tank (2) contains an KU builder. A commercial example of an ICI builder is ACRYSOL™ RM-2020 NPR HEUR Rheology Modifier, and a commercial example of a KU builder is ACRYSOL™ RM-8w NPR HEUR Rheology Modifier (a Trademark of The Dow Chemical Company or Its Affiliates).

In a second embodiment of the process of the present invention, the latex from pre-paint storage tank (2) and an aqueous dispersion of a matting agent from storage tank (3) are fed through valves (10) and (9) respectively into mixing chamber (5) and mixed to form an aqueous dispersion of the latex and the matting agent. Pre-paint storage tank (3) further contains a rheology modifier for the matting agent, typically an alkali swellable emulsion (ASE), such as a polyacrylic acid, or a hydrophobically modified alkali swellable emulsion (HASE) or a hydroxyethyl cellulose (HEC). In this embodiment, the ICI builder is advantageously added to mixing chamber (5) from one of additive storage tanks (4).

In a third embodiment of the process of the present invention pre-paints from pre-paint storage tanks (1), (2), and (3) are fed to mixing chamber (5) through valves (11), (10), and (9) and blended to form an aqueous dispersion of opacifying pigment, latex, and matting agent. It is also possible to pre-mix the pre-paints from storage tanks (1) and (2) to form an aqueous dispersion of the opacifying pigment and latex and feed the pre-paint from storage tank (3) further downstream through valve (13) into mixing chamber (5) to form an aqueous dispersion of the opacifying pigment, latex, and matting agent.

In each of the aforementioned embodiments one or more additives such as surfactants, dispersants, defoamers, coalescents, additional thickeners, organic opacifying pigments, block additives, photoinitiators, and solvents may be fed from any or all of additive storage tanks (4) into mixing chamber (5) through any or all of valves (12), (14), and (15). Alternatively, it may be desirable to include one or more of a defoamer, a surfactant, and a coalescent in any of the pre-paints. In a preferred embodiment, a defoamer, a surfactant, and a coalescent in the latex pre-paint.

Colorants are a special class of additives that require special care. For tinted paints, one or more aqueous solutions or dispersions of colorants from colorant addition system (7) is fed into mixing chamber (5) through valve (17), the final paint is formed and then directed into paint container (8). A paint with no opacifying pigment (the second embodiment) requires one or more colorants to form a deep base paint.

Suitable opacifying pigment include inorganic opacifying pigments having a refractive index of greater than 1.90. $TiO_2$ and ZnO are examples of inorganic opacifying pigments, with $TiO_2$ being preferred. Other opacifying pigments include organic opacifying pigments such as opaque polymers. Although an organic opacifying pigment may be used as a substitute for an inorganic opacifying pigment, it is more desirable to use the organic opacifying pigment as a supplement to augment the efficiency of the inorganic opacifying pigment. The organic opacifying pigment can be added to the mixing chamber from a separate additives tank. ROPAQUE™ ULTRA Opaque Polymers and AQACell HIDE 6299 Opaque Polymers are commercial examples of opaque polymers.

The aqueous dispersion of polymer particles (the latex) preferably have a z-average particle size by dynamic light scattering in the range of from 50 nm to 600 nm. Examples of suitable polymeric dispersions include acrylic, styrene-acrylic, urethane, alkyd, vinyl ester (e.g., vinyl acetate and vinyl versatate), and vinyl acetate-ethylene (VAE) polymeric dispersions, and combinations thereof. Acrylic and styrene-acrylic polymeric dispersions typically have a z-average particle size in the range of from 70 nm to 300 nm, while vinyl ester latexes generally have a z-average particle size in the range of from 200 nm to 550 nm as measured using dynamic light scattering. If it is desirable to feed more than one kind of latex into the mixing chamber, the latexes are preferably added from separate latex pre-paint storage tanks.

The latex pre-paint storage tank preferably contains an acrylic latex. As used herein, an "acrylic latex" comprises at least 30 weight percent, preferably at least 50 weight percent, and more preferably at least 80 weight percent structural units of an acrylate and/or methacrylate monomer. Acrylic latexes preferably comprise aqueous dispersions of polymer particles functionalized with methyl methacrylate and one or more acrylates selected from the group consisting of methyl acrylate, ethyl acrylate, n-butyl acrylate, 2-ethylhexyl acrylate, and 2-propylheptyl acrylate. As used herein, the term "structural unit" of a recited monomer refers to the remnant of the monomer after polymerization. For example, a structural unit of n-butyl acrylate is as illustrated:

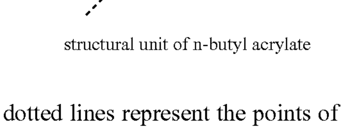

structural unit of n-butyl acrylate where the dotted lines represent the points of attachment of the structural unit to the polymer backbone.

Acrylic latexes also preferably comprise structural units of an acid monomer including carboxylic acid, sulfur acid, and phosphorus acid monomers, as well as salts thereof, and combinations thereof. Examples of suitable carboxylic acid monomers include methacrylic acid, acrylic acid, and itaconic acid and salts thereof; examples of suitable sulfur acid monomers include sulfoethyl methacrylate, sulfopropyl methacrylate, styrene sulfonic acid and salts thereof, vinyl sulfonic acid and salts thereof, and 2-acrylamido-2-methyl propanesulfonic acid and salts thereof; examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including 2-phosphoethyl methacrylate (PEM) and salts thereof.

A preferred acrylic latex comprises structural units of a carboxylic acid monomer and a phosphorus acid monomer, preferably PEM. The acrylic polymer particles may have an acorn morphology (as described in U.S. Pat. No. 9,920,194 B2), or a spherical morphology, or a blend of spherical and acorn morphologies. The acrylic polymer particles with an acorn morphology may comprise a protuberating phosphorus acid functionalized core, more particularly a protuberating PEM functionalized core.

The matting agent fed from the matting agent pre-paint storage tank may be an organic matting agent or an inorganic matting agent. Examples of organic matting agents are aqueous dispersions of polymeric microspheres having a median weight average particle size ($D_{50}$) in the range of from 0.7 μm, preferably from 1 μm, and more preferably from 2 μm, and most preferably from 4 μm, to 30 μm, preferably to 20 μm, and more preferably to 13 μm, as measured using a Disc Centrifuge Photosedimentometer (DCP). These organic polymeric microspheres are characterized by being non-film-forming and preferably having a crosslinked low $T_g$ core, that is, a crosslinked core having a $T_g$, as calculated by the Fox equation, of not greater than 25° C., more preferably not greater than 15° C., and more preferably not greater than 10° C.

The crosslinked core of the organic polymeric microspheres preferably comprises structural units of one or more monoethylenically unsaturated monomers whose homopolymers have a $T_g$ of not greater than 20° C. (low $T_g$ monomers) such as methyl acrylate, ethyl acrylate, n-butyl acrylate, and 2ethylhexyl acrylate. Preferably, the crosslinked low $T_g$ core comprises, based on the weight of the core, from 50, more preferably from 70, more preferably from 80, and most preferably from 90 weight percent, to preferably 99, and more preferably to 97.5 weight percent structural units of a low $T_g$ monoethylenically unsaturated monomer. n-Butyl acrylate, and 2ethylhexyl acrylate are preferred low $T_g$ monoethylenically unsaturated monomers used to prepare the low $T_g$ core.

The crosslinked core further comprises structural units of a multiethylenically unsaturated monomer, examples of which include allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate. The concentration of structural units of the multiethylenically unsaturated monomer in the crosslinked microspheres is preferably in the range of from 1, more preferably from 2 weight percent, to 9, more preferably to 8, and most preferably to 6 weight percent, based on the weight of the core.

The crosslinked polymeric core is preferably clad with high a $T_g$ shell, that is, a shell having a $T_g$ of at least 50° C., more preferably at least 70° C., and most preferably at least 90° C. The shell preferably comprises structural units of monomers whose homopolymers have a $T_g$ greater than 70° C. (high $T_g$ monomers), such as methyl methacrylate, styrene, isobornyl methacrylate, cyclohexyl methacrylate, and t-butyl methacrylate. The high $T_g$ shell preferably comprises at least 90 weight percent structural units of methyl methacrylate.

Examples of inorganic matting agents include talc, clay, mica, and sericite; $CaCO_3$; nepheline syenite; feldspar; wollastonite; kaolinite; dicalcium phosphate; and diatomaceous earth. Although it is possible to feed a blend of a variety of matting agents into the mixer from a single storage tank, it is preferable to feed different matting agents from separate tanks.

The opacifying pigment, latex, and matting agent pre-paint storage tanks each further comprise a rheology modifier. The concentration and type of rheology modifier included in each pre-paint storage tank is readily predetermined to achieve the desired Brookfield, KU, and ICI viscosity of the final paint. Examples of suitable rheology modifiers include hydrophobically modified ethylene oxide urethane polymers (HEURs); hydrophobically modified alkali swellable emulsion (HASEs); alkali swellable emulsions (ASEs); and hydroxyethyl cellulosics (HECs), and hydrophobically modified hydroxyethyl cellulosic (HMHECs); and combinations thereof.

Preferably, the latex pre-paint storage tank and the opacifying pigment pre-paint storage tank each comprise a HEUR and the matting agent pre-paint storage tank comprises an ASE or a HASE, or an HEC.

The process of the present invention provides a way of making a wide variety of paints quickly with minimal cleanup between runs. Significantly, no further mixing is required after the in-line mixed pre-paints are dispensed into the paint container.

EXAMPLES

Preparation of Pre-Paints

The following pre-paint storage vessels were prepared:

1) A latex pre-paint containing a latex, DOWSIL™ 8590 Defoamer (DC8590 Defoamer), TRITON™ CF-10 Surfactant (CF-10 Surfactant), Texanol Coalescent, and ACRYSOL RM-8w HEUR Rheology Modifier (RM-8w) were prepared and transferred to a latex pre-paint vessel;
2) A $TiO_2$ pre-paint containing Kronos 4311 $TiO_2$ (4311 $TiO_2$) and ACRYSOL RM-2020NPR HEUR Rheology Modifier (RM-2020NPR) were prepared by placing gallon containers of 4311 $TiO_2$ slurries on a roller mill and mixed for at least 1 h. The mixed slurry was transferred to $TiO_2$ pre-paint vessel, followed by addition of RM-2020NPR. The contents were then mixed using a 3-prong paint stirrer.
3) A matting pre-paint containing a matting agent and ACRYSOL ASE-60 Rheology Modifier (ASE-60) were prepared and placed in a matting agent pre-paint vessel.

(DOWSIL and TRITON are Trademarks of The Dow Chemical Company or Its Affiliates.)

EXAMPLES

In the following examples, BA refers to butyl acrylate, MMA refers to methyl methacrylate.

In the following examples, Latex 2 is a BA/MMA/PEM latex with spherical morphology having a solids content of 46% by weight and a calculated $T_g$ by the Fox equation of 14° C. Latex 3 is a BA/MMA/PEM latex with acorn morphology having a solids content of 49% by weight and a calculated $T_g$ by the Fox equation of 10° C.

Example 1—Preparation of a High Gloss Paint with a Non-Absorbing Binder

Latex and $TiO_2$ pre-paints stored in separate storage vessels were concurrently pumped through a static in-line mixer (3/16" o.d., Model 3/16-12, Koflo Corporation) fitted with a Y-shaped connector and a 3/16" inner diameter plastic tubing (Masterflex pump tubing model 96410-15, MasterFlex). The latex pre-paint (39.6% vol solids) contained a pre-mixed blend of water (143.4 g), RHOPLEX™ VSR-1050 Acrylic Latex (660.3 g, a Trademark of The Dow Chemical Company or its Affiliates), DC8590 Defoamer (0.17 g), CF-10 Surfactant (0.4 g), Texanol Coalescent (16.5 g), and RM-8w (1.9 g); and the $TiO_2$ pre-paint vessel 2 contained 4311 $TiO_2$ (800 g) and RM2020-NPR (27.2 g). Peristaltic pumps (model 7524-50 MasterFlex L/S digital economy drive pump with a dual easy load (model 7518-10) connected) were used to pump the pre-paints through the in-line mixer. The flow rate of the peristaltic pump displacing the binder pre-paint was set to 18-20 m/min and the flow rate of the peristaltic pump displacing the titanium dioxide pre-paint was set to 4 m/min. The amounts of pre-paints displaced from the vessels were determined gravimetrically. The final paint flowing out of the Y-shaped connector containing the in-line mixer was collected in a plastic paint container. The paint was collected over 8-10 min. PVC, volume solids, $KU_o$, $KU_f$, gloss, and contrast ratio were measured.

Example 2—Preparation of a High Gloss Paint with a PEM-Functionalized Absorbing Binder The procedure as described in Example 1 was used except that the latex pre-paint vessel contained a pre-mixed blend of water (35.2 g), Latex 2 (777.0 g), DC8590 Defoamer (0.17 g), CF-10 Surfactant (0.4 g), Texanol Coalescent (17.9 g), and RM-8w (1.9 g), 39.6% vol solids. The volume solids of the latex pre-paint was 39.6%; PVC, volume solids, $KU_o$, $KU_f$, gloss, and contrast ratio were measured.

Example 3—Preparation of a High Gloss Paint with a PEM-Functionalized Absorbing Binder The procedure as described in Example 1 was used except that the latex pre-paint vessel contained a pre-mixed blend of water (71.9 g), Latex 3 Polymer (743.9 g,), DC8590 Defoamer (0.17 g), CF-10 Surfactant (0.4 g), Texanol Coalescent (17.9 g), and RM8w (1.5 g). The volume solids of the latex pre-paint was 39.6%; PVC, volume solids, $KU_o$, $KU_f$, gloss, and contrast ratio were measured.

Example 4—Preparation of a Low Gloss Paint with a PEM-functionalized Absorbing Binder A low gloss paint was prepared by placing an additional Y-shaped connector containing an in-line mixer to a matting agent pre-paint storage vessel downstream of the Y-shaped connector connecting the Latex 3 and $TiO_2$ pre-paint storage vessels. The matting agent was a dispersion of acrylic microspheres having a $D_{50}$ particle size of 0.85 μm prepared substantially as described in U.S. Pat. No. 9,410,053 B2, Sample D, column 14, lines 1-48. Immediately after the latex and $TiO_2$ pre-paints were mixed in a first in-line mixer, the $TiO_2$/latex blend was contacted with the flow of organic microspheres in a Y-shaped connector and tubing containing an in-line mixer. The flow rate from the latex pre-paint storage vessel was 16 mL/min, and the flow rates from the $TiO_2$ and matting agent pre-paint storage vessels were both 3 mL/min. The final paint flowing out of the upstream Y-shaped connector containing the in-line mixer was collected in a plastic paint container. The paint was collected over 8-10 minutes. The volume solids of the latex pre-paint was 39.0%; PVC, volume solids, $KU_o$, $KU_f$, gloss, and contrast ratio were measured.

Example 5—Preparation of a Low Gloss Paint with a PEM-Functionalized Absorbing Binder A low gloss paint was prepared as described in Example 4 except that the matting agent was a dispersion of microspheres (8.5 μm, 34.2% solids) prepared in accordance with the procedure as described in U.S. Pat. No. 10,676,580, Example 4, except that 4.2 g of oligomer seed was used instead of 12.8 g of oligomer seed. PVC, volume solids, $KU_o$, $KU_f$, gloss, and contrast ratio were measured.

Table 1 show the $TiO_2$ PVC, Matting Agent PVC (MA PVC), volume solids (VS), initial KU ($KU_o$), KU after 1 d ($KU_f$), ΔKU, 60/85° gloss, and contrast ratios for each sample.

| | Ex 1 | Ex 2 | Ex 3 | Ex 4 | Ex 5 |
|---|---|---|---|---|---|
| $TiO_2$ PVC | 18.8 | 18.7 | 18.8 | 14.6 | 14.4 |
| MA PVC | — | — | — | 10.3 | 11.1 |
| VS (%) | 40 | 40 | 40 | 38.7 | 39.0 |
| $KU_o$ | 97 | 132 | 139 | 115 | 116 |
| $KU_f$ | 101 | 140 | 140 | 120 | 121 |
| ΔKU | 4 | 8 | 1 | 5 | 5 |
| 60/85° gloss | 66.6/92.1 | 75.5/93.6 | 72.8/93.7 | 50.3/83 | 18.2/24.1 |
| Contrast ratio | 92.6 | 94.6 | 94.1 | 92.1 | 91.3 |

A wide variety of paints can be prepared by the process of the present invention by simply adjusting the flow rates from the pre-paint storage tanks. The fully blended paints are prepared before the paint is dispensed into the paint container. As such, no additional stirring or shaking of the contents in the paint can is needed.

The invention claimed is:

1. A process for preparing a container of paint comprising the steps of:

a) feeding into a mixing chamber 1) an aqueous dispersion of polymer particles, a surfactant, and a defoamer from a first pre-paint storage vessel and 2) i) an aqueous dispersion of opacifying pigment particles from a second pre-paint storage vessel and ii) an aqueous dispersion of a matting agent from a third pre-paint storage vessel; wherein each of the pre-paint storage tanks further comprise a rheology modifier and wherein the mixing chamber is an in-line continuous flow mixing chamber;

b) mixing the aqueous dispersions in the mixing chamber to form a fully blended paint; and c) dispensing the fully blended paint into a paint container;

wherein the polymer particles have a z-average particle size in the range of from 50 nm to 600 nm;

wherein:

the aqueous dispersion of polymer particles is an acrylic latex;

the opacifying pigment is $TiO_2$; and the aqueous dispersion of the matting agent is an aqueous dispersion of organic microspheres having a median weight average particle size in the range of from 0.7 μm to 30 μm.

2. The process of claim 1 wherein in step a), one or more additives are fed into the mixing chamber from one or more separate additives storage vessels, wherein the one or more additives is selected from the group consisting of surfactants, defoamers, coalescents, solvents, rheology modifiers, block additives, photoinitiators, and organic opacifying pigments.

3. The process of claim 1 wherein the acrylic latex is functionalized with 2-phosphoethyl methacrylate or a salt thereof.

4. A process for preparing a container of paint comprising the steps of:

a) feeding into a mixing chamber 1) an aqueous dispersion of an acrylic latex functionalized with 2-phosphoethyl methacrylate or a salt thereof, a surfactant, and a defoamer from a first pre-paint storage vessel and 2) an aqueous dispersion of organic microspheres from a third pre-paint storage vessel, wherein the organic microspheres have a median weight average particle size in the range of from 0.7 μm to 30 μm; wherein each of the pre-paint storage tanks further comprise a rheology modifier and wherein the mixing chamber is an in-line continuous flow mixing chamber;

b) mixing the aqueous dispersions in the mixing chamber to form a fully blended paint; and c) dispensing the fully blended paint into a paint container;

wherein the polymer particles have a z-average particle size in the range of from 50 nm to 600 nm.

5. The process of claim 4 wherein an aqueous solution or dispersion of a colorant is fed into the mixing chamber from an additives storage vessel and mixed with the aqueous dispersion of the acrylic latex and the aqueous dispersion of organic microspheres to form a deep base paint, which the deep based paint is then dispensed into the paint container as the fully blended paint.

* * * * *